United States Patent [19]

Shorey et al.

[11] 4,354,705
[45] Oct. 19, 1982

[54] CABLE GRIPS

[75] Inventors: Louis W. Shorey; Keith W. Hill; Alan R. Davis, all of Minehead, England

[73] Assignee: Harvey Hubbell Incorporated, Orange, Conn.

[21] Appl. No.: 196,726

[22] Filed: Oct. 14, 1980

[30] Foreign Application Priority Data

Oct. 16, 1979 [GB] United Kingdom ................. 7935868

[51] Int. Cl.³ .......................... F16L 3/00; F16G 11/02
[52] U.S. Cl. .......................... 294/86 CG; 24/115 N; 248/60; 403/373
[58] Field of Search .......................... 294/20, 86 CG; 24/115 R, 115 A, 115 H, 115 N, 205.19; 248/60; 285/235, 236, 305; 403/291, 373

[56] References Cited

U.S. PATENT DOCUMENTS

| | | | |
|---|---|---|---|
| 1,769,479 | 7/1930 | Whaley | 24/115 N |
| 1,994,674 | 3/1935 | Van Inwagen | 294/86 CG |
| 2,017,625 | 10/1935 | Kellems | 294/86 CG |
| 2,318,164 | 5/1943 | Kellems | 294/86 CG |
| 2,560,418 | 7/1951 | Di Palma | 403/373 |
| 3,638,987 | 2/1972 | Fidrych | 294/86 CG |

*Primary Examiner*—Johnny D. Cherry
*Attorney, Agent, or Firm*—Jerry M. Presson

[57] ABSTRACT

An open-mesh woven wire cable grip for fitting over an end portion of a cable with a larger diameter discontinuity therein comprises at its leading end a tubular portion of 'closed' form and, woven integrally therewith, a shorter tail portion of 'split' form which may be closed by lacing or rodding.

4 Claims, 10 Drawing Figures

CABLE GRIPS

BACKGROUND OF THE INVENTION (1) Field of the Invention

This invention relates to cable grips and concerns grips of the kind which, in use, take the form of a woven, open-mesh flexible tube which is used securely to enclose a cable or cables along at least part of the length thereof.

(2) Description of the Prior Art

Such cable grips can be used to pull a cable into a required position or to support a cable in a desired position or both. To facilitate their use they are usually provided at their draft or leading end with one or a pair of loops or eyes. For example, if a cable is to be fixed in position with its longitudinal axis having a substantial vertical component, the cable grip would be arranged on the cable with the eyes (taking the case where a pair of eyes is provided) at or near the end of the cable which is to be uppermost. A lifting member can be arranged to engage the eyes and pull the grip and cable upwardly until the cable is in the required position and then the eyes can be secured to a support. Thus the weight of the cable is taken by the grip and support, reducing or preventing longitudinal strain in the conductors in the case of an electric cable, and absorbing vibration and flexural forces. The cable grip can be used indoors or outdoors on any suitable structure such as a building or pole, down an excavation, in a mine shaft and elsewhere.

Cable grips are manufactured in two basic forms; the 'closed' form and the 'split' form.

The closed cable grip is made in tubular form from two sets of helically disposed and interwoven wire strands of opposite hand. To prepare the grip for use it is axially compressed, and thus radially expanded, and pushed in this condition tail first over the end of the cable until it is in its required position. The axial compression is then relieved, causing the grip to contract radially and, as the normal internal diameter of the grip is less than the diameter of the cable, grip it lightly. If then the grip is pulled by the eyes in the opposite direction to that in which it was pushed on, the tension in the individual strands forming the open-mesh lattice tries to cause a further reduction in its diameter so that it grips the cable tightly and then pulls the cable in the said opposite direction. This kind of grip is used when a free end of the cable is available for introduction into the tail end of the cable grip. Examples of such a grip are those sold under Nos. 022-01-A and 022-06 in the Catalogue of Harvey Hubbell Ltd. Cable grips are usually of the so-called endless weave type and woven from lengths of wire which are bent at their mid-points to form loops. As weaving is started at the tail end remote from the eyes the grip terminates at this end in a series of loops which limits the amount by which the diameter of the tail end can be increased by endwise compression of the grip. Thus one disadvantage of the closed cable grip of a given nominal diameter is that the open tail end remote from the eyes can be increased by only a relatively small amount although the diameter of the tube at points intermediate its ends can be increased by progressively greater amounts up to a point substantially equidistant from the ends. Accordingly if there is a discontinuity in the length of cable, such as a connector having a relatively large diameter with respect to that of the cable, then the open tail end cannot be enlarged sufficiently to pass over it.

It has been assumed in the above description that the grip is of the 'constant weave' type, that is the mesh of the lattice is of constant size and shape throughout the length of the grip. However there is another type of grip, known as the 'variable weave' type in which, at the tail end, the mesh size is smaller or the angles at the longitudinal corners of the diamonds formed by the intersecting strands of the mesh are greater, than at the leading or draft end. The advantage thought to be gained by the adoption of a variable weave grip is that, when a force is applied to the eyes, the tail end of the grip is first to undergo a radial contraction which advances progressively towards the leading end of the grip, thus ensuring maximum frictional engagement with the cable throughout the length of the grip. However the disadvantage of variable weave grips is that, because of the limitations imposed by the higher weave angles and/or smaller mesh at the tail end, the increase in its diameter that can be gained by axial compression is even more restricted than in the constant weave type and thus the problem of enlarging the tail end to pass over a discontinuity is exacerbated. In such cases, and in the case where a free end of cable is not available, it is necessary to use a 'split' form of cable grip.

The split cable grip is similar in principle to the closed grip but is formed as an elongate mesh which is wrapped around the cable, or cables, and then the longitudinal edges are joined together as by lacing with a strand or strands, usually, of a similar material or by means of a rod which is passed through preformed loops on the longitudinal edges of the mesh. Examples of such grips are those sold under Nos. 022-02-A and 022-03-A in the catalogue of Harvey Hubbell Ltd. The split cable grip can accommodate discontinuities of larger diameter than the cable but has the disadvantage that it has to be 'laced-up' in position and this can be time-consuming and laborious especially in confined spaces: for example, one such use of the cable grip is for preventing strain in the cables and their connectors to mining equipment in underground pit shafts and tunnels. A further disadvantage of the split cable grip is that it is less strong than a comparable closed cable grip.

There has thus been a long-standing requirement for a cable grip which has the advantages of the closed grip but which can accommodate relatively large discontinuities along the length of the cable.

SUMMARY OF THE INVENTION

According to the invention there is provided a cable grip characterised in that it is of 'closed' tubular form along part of its length and of split form along the remainder of its length. Preferably, the length of the split part is small with respect to the closed part. Thus in a grip according to the invention the maximum effective diameter to which the grip can be enlarged for fitting is not restricted to that of its tail end.

Thus a free end of a cable having a discontinuity of larger diameter than the cable intermediate its end can be introduced into the entry of the closed part of the grip at the junction with the split part and pushed through the grip. It has been found that the entry to the closed part of the grip, being intermediate the ends, can expand to a much greater extent than the entry at the end of a conventional 'closed' grip so that a cable having a relatively large connector can be pushed through the grip until the connector is positioned within the closed part. It is then a simple matter to join together the longitudinal edges of the relatively short lengths of the split part of the grip if necessary.

BRIEF DESCRIPTION OF THE DRAWINGS

In the accompanying drawings

DETAILED DESCRIPTION OF THE PRIOR ART

Figures 1, 2:
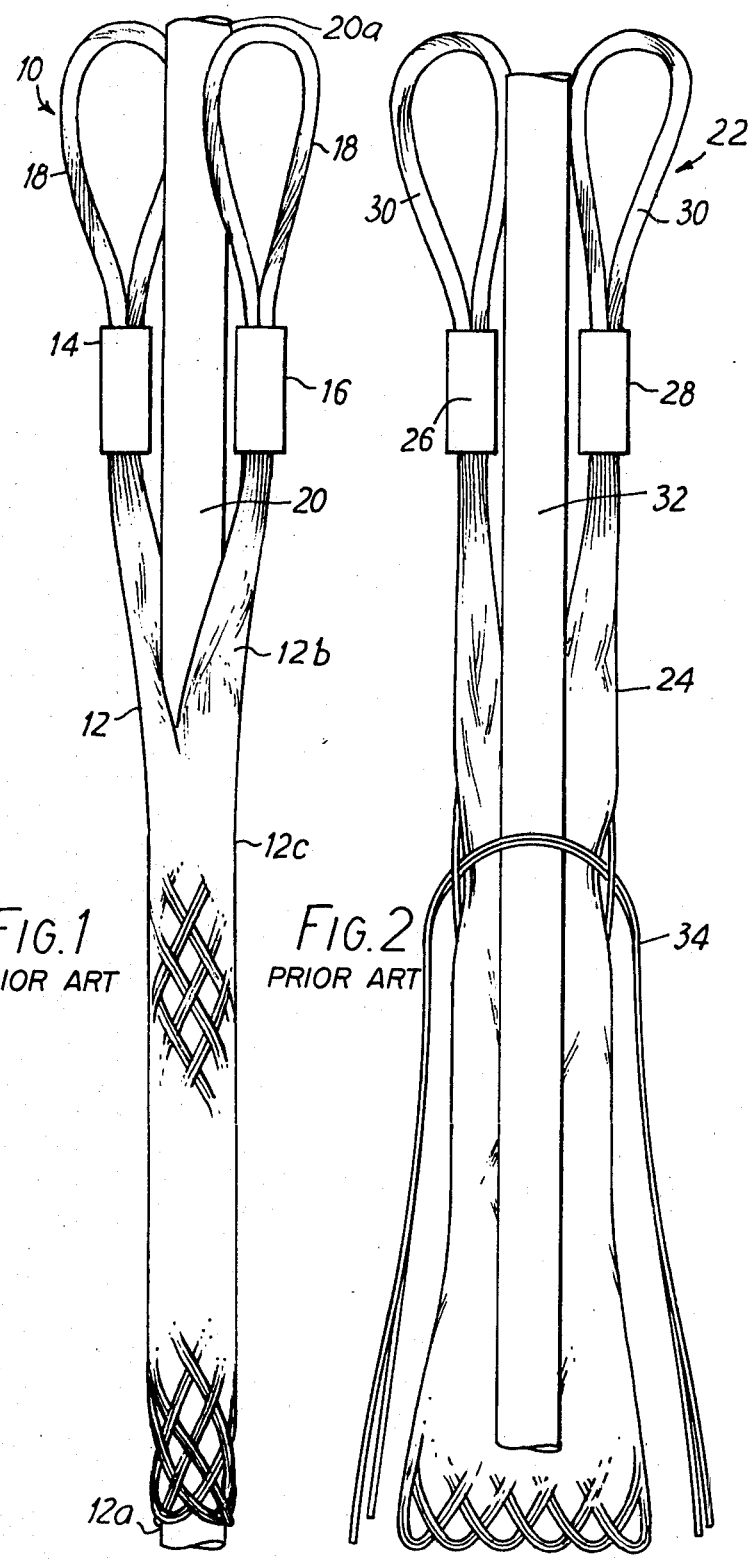
FIG. 1 is a partial side view of a conventional closed cable grip.
FIG. 2 is a partial side view of a conventional split cable grip.

Referring to FIG. 1 there is shown a closed cable grip 10 in the form of a flexible, braided wire open-mesh tube 12. It will be seen that the tube 12 is terminated in an open tail end 12a wherein the individual wires making-up the tube 12 are continuous, their ends being terminated at or near the other, draft end 12b, in this case in tubular metal sleeves 14, 16 from which cable loops, or eyes, 18 extend.

In use, the open tail end 12a of the grip 10 is axially compressed and pushed over the free end of a length of cable 20. The grip 10 is then slid along the cable 20 until it reaches its desired position where it is allowed to relax and grip the cable 20 lightly.

The cable grip 10 can then be pulled into its required position by pulling the eyes 18 (for example in an upward direction in FIG. 1). The resultant tension elongates the grip 10 causing it to grip the cable 20 more tightly. The eyes 18 can also be affixed to a support member so that a substantial part of any strain in the arrangement 10, 20 is taken-up in the cable grip 10.

As aforementioned, this grip 10 can be used if there is a free end 20a of the cable 20 over which the end 12a of the tube 12 can be pushed. However, if there is a discontinuity, for example a plug and socket arrangement connecting two lengths of cable 20, larger than the diameter of the cable 20 then it is difficult to increase the diameter of the tail end 12a to force the tube 12 over the discontinuity, although it has been found that the diameter of the tube 12 at an intermediate point say 12c can be increased by a considerably greater amount.

Thus in the event that the cable 20 does not have a free end or there is a relatively large diameter discontinuity along its length it is usual to use a 'split' cable grip now to be described with reference to FIG. 2.

Referring now to FIG. 2, there is shown a 'split' cable grip 22 in the form of an elongate, open-mesh, substantially flat, braided, flexible wire arrangement 24. The grip 22 is terminated at one end in a pair of tubular metal sleeves 26, 28 from which cable loops, or eyes, 30 extend.

In use, the arrangement 24 is wrapped around a cable 32 and then laced together by a double lace 34 so that when complete the grip 22 is similar in appearance to the grip 10. Alternatively small loops can be arranged along the longitudinal edges of the arrangement 24 so that when it is wrapped round the cable 32 the small loops align around a common axis and then a rod of appropriate size pushed through the small loops to hold the grip in its tubular configuration.

Although somewhat time-consuming in assembly it will be seen that this kind of cable grip will operate in a similar fashion to that of FIG. 1 and it does have the advantage that, because of the mesh form, it can be stretched at a point intermediate its ends to accommodate a discontinuity of relatively large diameter.

DETAILED DESCRIPTION OF THE INVENTION

Figure 3:
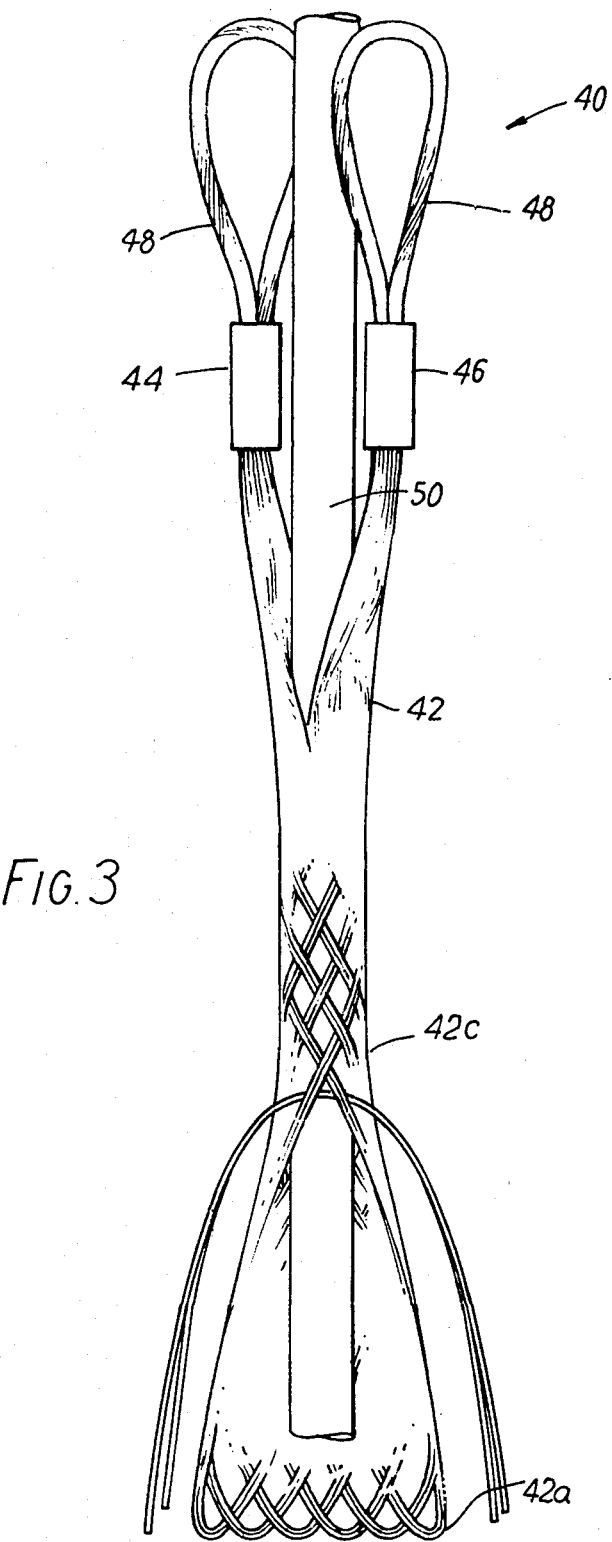
FIG. 3 is a partial side view of an embodiment of a cable grip according to the invention.

Referring now to FIG. 3 there is shown an embodiment of a cable grip 40 according to the invention. It will be seen that the upper part (in the drawing) from about part 42c of the grip 40 is similar to the grip 10 described with reference to FIG. 1 having a tubular sleeve 42 with terminations 44, 46 from which cable loops, or eyes, 48 extend. However, the grip 40 is not tubular, but rather open, from about the position 42c to the end 42a. As aforementioned, if the grip 40 were tubular to the end 42a, the maximum diameter of a cable 50, or a relatively large diameter discontinuity (not shown), in the cable acceptable by the grip 40 would be limited by the maximum diameter to which the end 42a could be expanded. However, by leaving open the end of grip 40 between the positions 42c and 42a, it has been found that the diameter of the tubular part at position 42 can be increased quite considerably to accept the usual relatively large diameter discontinuity such as a plug and socket so that the grip can be pushed over the discontinuity and cable to the required position. The end of the grip between positions 42c and 42a could be left open but it is preferred that they be 'laced' or 'rodded' up as described with reference to FIG. 2.

Figure 4:
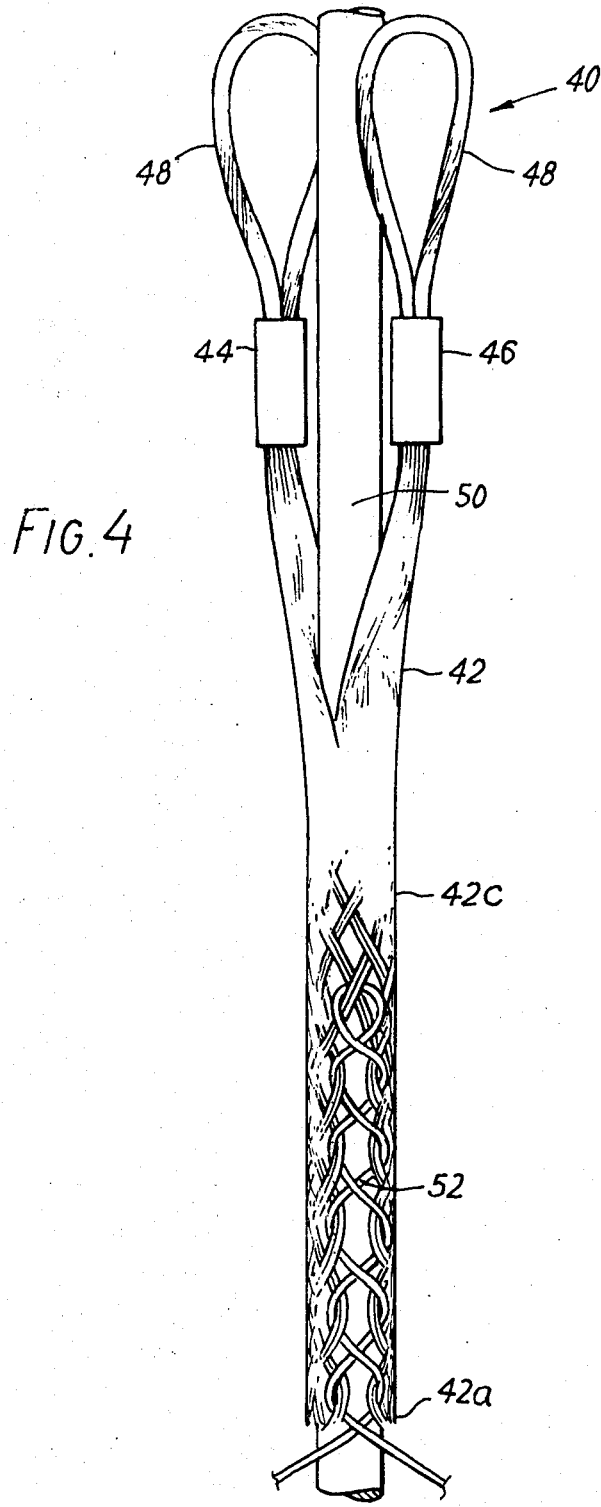
FIG. 4 is a view, similar to that of FIG. 3, with the split portion of the cable laced.
Figure 5:
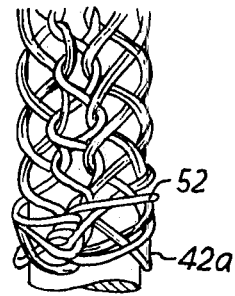
FIG. 5 is a detail of FIG. 4 with the split portion laced and tied.

The split end of the grip 40 which has been laced with a single lace 52 is shown in FIG. 4. The free ends of the lace 52 are then twisted together, passed in opposite directions twice around the end 42a of the grip 40 and then again twisted together to achieve the fully laced up state shown in FIG. 5.

Thus the cable grip of FIG. 3 combines the advantages of the grips of FIGS. 1 and 2 with the additional advantage that the grip 40 which is substantially of the same kind as that described with reference to FIG. 1 because of the realisation that the diameter of a closed grip expands to a greater extent at intermediate postions than at the end. The length of the portion 42c and 42a of the grip is not critical but it should, of course, be long enough to allow the required maximum diameter at position 42c. A further advantage of the grip according to the invention is that a split type of grip which is laced-up along the length is weaker than an equivalent closed grip. Thus the invention has the advantage that the tensile strength of the cable grip is effectively equal to that of a closed grip while obtaining the advantages of the split type grip.

The manufacture of a grip according to the invention will now be described.

Figure 6:
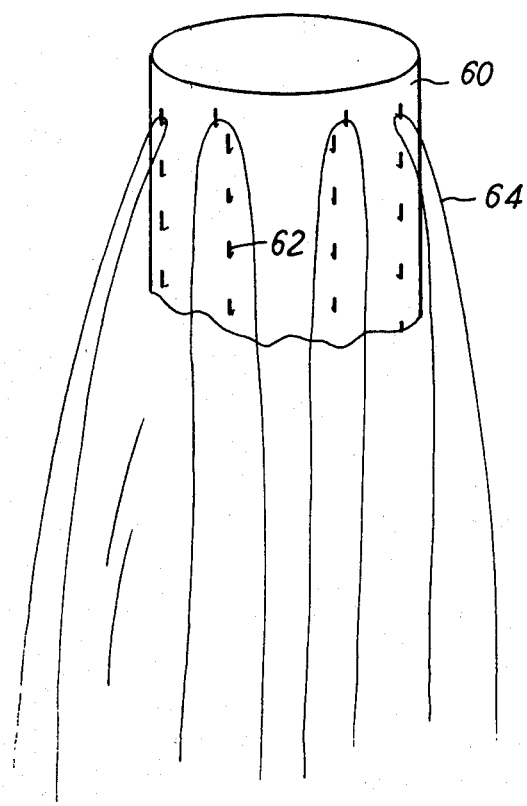
FIG. 6 is a partial side view illustrating a first stage in the manufacture on a mandrel of a grip according to the invention.
Figure 7:
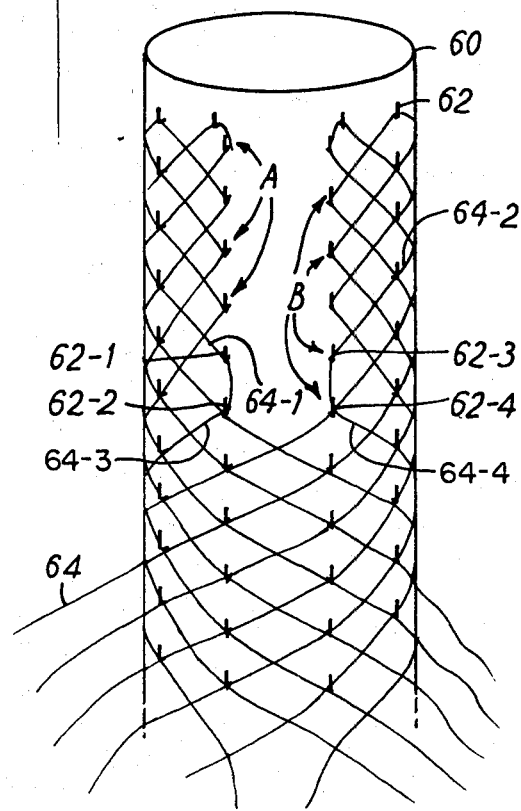
FIG. 7 is a partial side view illustrating a further stage in the manufacture of the grip of FIG. 6.
Figure 8:
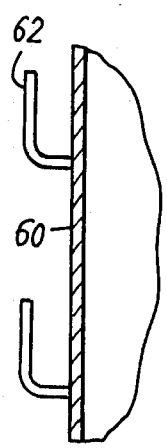
FIG. 8 is a partial section through the mandrel of FIG. 6.
Figure 9:
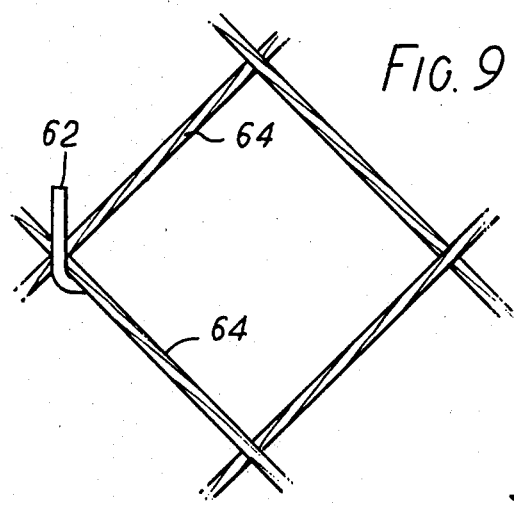
FIG. 9 is a detail of FIG. 7.

As shown in FIG. 6 a mandrel 60 has located around the surface thereof a number of pegs 62 (shown in detail in FIG. 8) at intervals corresponding to the required size of the diamond-shaped lattice work. Lengths 64 of the chosen material, which in the present case is a stranded galvanized steel wire, are doubled back on themselves and each length 64 is hooked at its centre over a respective one of the top row of pegs 64. Weaving is then carried out in an over and under arrangement in a conventional manner to achieve the pattern shown in FIG. 7, the details of the interrelation of the lengths 64 of wire and their relation with a peg 62 being shown in FIG. 9. To form the split end of the grip weaving is terminated at the adjacent longitudinal rows of pegs A and B thus leaving a longitudinal gap or slit at the circumference of the grip.

To change to a tubular or closed construction the lengths 64-1 and 64-2 are passed round two longitudinally adjacent pairs of pegs 62-1, 62-2, and 62-3, 62-4 respectively before being led in a helical path round the mandrel 60 until the desired length of grip has been achieved. Lengths 64-3 and 64-4 are led past pegs 62-2 and 62-2 respectively to initiate a helical path and subsequent lengths 64 are dealt with similarly until the draft end of the grip is terminated in a conventional manner.

Figure 10:
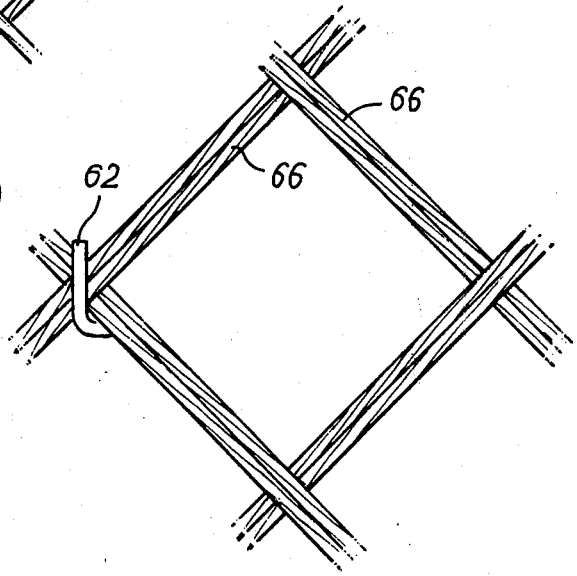
FIG. 10 is a detail, similar to that of FIG. 9, illustrating a stage in the manufacture of the grip of FIG. 3.

In FIG. 10 is shown the weaving arrangement at a peg 62 when a double weave of wires 66 is employed.

The cable grip according to the invention can take various forms, for example the grip can be terminated in a single loop, or eye which is secured to the mesh by a swaged aluminium collar rather than the pair of loops as described. Also the grips have been described with a double weave, that is two wires are used in parallel throughout the construction, and a single weave using one wire, but a triple weave using three wires or more could be used to give maximum strength and rigidity depending to some extent on the application. Although galvanised steel wire is the most common material bronze wire may also be used; moreover a single strand of wire or a monofilament plastics material such as nylon may sometimes be used in contexts where these materials provide sufficient flexibility.

Although called cable grips, they are equally useful for use with other elongate material, such as rope.

It should also be mentioned that the longitudinal edges of a split tail end of a cable grip according to the invention may be joined by hooking, as well as by lacing or rodding; and that other weaving arrangements besides the previously-described simple over and under arrangement may be employed, for example two over and one under.

What is claimed is:

1. A cable grip of open-mesh construction formed by interwoven strands which comprises a leading end portion of closed tubular form and a tail end portion of split form, said leading end portion being closed circumferentially by interwoven strands of the grip, and said tail end portion including a first series of mesh loops defining one end of the split and a second series of mesh loops defining the opposite edge of the split, and means for binding the first and second series of loops together for closing the tail end of the grip.

2. A grip according to claim 1, in which the length of the tail end portion is less than that of the leading end portion.

3. A grip according to claim 1 or 2, in which the mesh is of the constant weave type.

4. A grip according to claim 3, wherein the binding means comprises lacing.

* * * * *